(12) United States Patent
Muchiyev et al.

(10) Patent No.: US 9,404,939 B1
(45) Date of Patent: Aug. 2, 2016

(54) PRE-AMPLIFIER CARTRIDGE FOR TEST EQUIPMENT OF HEAD GIMBAL ASSEMBLY

(71) Applicant: Western Digital (Fremont), LLC, Fremont, CA (US)

(72) Inventors: Sergey Muchiyev, Mountain View, CA (US); Paul Dylan Sherman, San Jose, CA (US); Trung Vinh, San Jose, CA (US); Rungnapa Dangrungroj, Thanyaburi (TH)

(73) Assignee: Western Digital (Fremont), LLC, Fremont, CA (US)

( * ) Notice: Subject to any disclaimer, the term of this patent is extended or adjusted under 35 U.S.C. 154(b) by 116 days.

(21) Appl. No.: 14/313,842

(22) Filed: Jun. 24, 2014

(51) Int. Cl.
 *G01B 5/28* (2006.01)
 *G01R 1/04* (2006.01)
 *G01R 1/073* (2006.01)

(52) U.S. Cl.
 CPC .............. *G01R 1/0408* (2013.01); *G01R 1/073* (2013.01)

(58) Field of Classification Search
 CPC ..... G11B 5/455; G11B 5/3166; G11B 5/3189
 USPC .......................... 324/754.07, 754.03, 754.13
 See application file for complete search history.

(56) References Cited

U.S. PATENT DOCUMENTS

| | | | |
|---|---|---|---|
| 5,300,952 A * | 4/1994 | Wada .................... | G03G 5/02 346/135.1 |
| 5,844,420 A | 12/1998 | Weber et al. | |
| 6,049,973 A | 4/2000 | Frank, Jr. et al. | |
| 6,467,153 B2 | 10/2002 | Butts et al. | |
| 6,651,192 B1 | 11/2003 | Viglione et al. | |
| 6,657,801 B1 | 12/2003 | Chue et al. | |
| 6,687,093 B1 | 2/2004 | Butler et al. | |
| 6,751,041 B1 | 6/2004 | Codilian et al. | |
| 6,788,480 B1 | 9/2004 | Codilian et al. | |
| 6,791,782 B1 | 9/2004 | Codilian et al. | |
| 6,792,669 B2 | 9/2004 | Codilian | |
| 6,798,592 B1 | 9/2004 | Codilian et al. | |
| 6,894,861 B1 | 5/2005 | Codilian et al. | |
| 6,897,393 B1 | 5/2005 | Codilian et al. | |
| 6,898,044 B1 | 5/2005 | Chheda | |
| 6,943,972 B1 | 9/2005 | Chue et al. | |
| 7,003,626 B1 | 2/2006 | Chheda et al. | |
| 7,027,242 B1 | 4/2006 | Terrill et al. | |
| 7,046,467 B1 | 5/2006 | Chheda | |
| 7,058,759 B1 | 6/2006 | Reiser et al. | |
| 7,072,129 B1 | 7/2006 | Cullen et al. | |
| 7,076,391 B1 | 7/2006 | Pakzad et al. | |
| 7,076,603 B1 | 7/2006 | Chheda | |
| 7,131,346 B1 | 11/2006 | Buttar et al. | |
| 7,136,242 B1 | 11/2006 | Chue et al. | |

(Continued)

*Primary Examiner* — Vincent Q Nguyen

(57) ABSTRACT

A device may be or include a cartridge configured to receive a head gimbal assembly (HGA) of a storage device and electrically connect the HGA to a HGA testing device. The cartridge may include a pre-amplifier configured to be electrically connected with corresponding electrical traces of the HGA and to the HGA testing device; a plurality of probe pins electrically connected to the pre-amplifier and configured to be electrically connected to corresponding electrical traces of the HGA; and a clamper including a dielectric layer and configured to selectively assume an open or closed configuration. In the closed configuration, the plurality of probe pins is electrically connected to corresponding ones of the plurality of electrical traces of the HGA. The clamper, in combination with at least some of the probe pins, forms an electrical filter configured to at least condition signals to and from the pre-amplifier and the HGA.

26 Claims, 6 Drawing Sheets

(56) References Cited

U.S. PATENT DOCUMENTS

| | | |
|---|---|---|
| 7,139,145 B1 | 11/2006 | Archibald et al. |
| 7,145,744 B1 | 12/2006 | Clawson et al. |
| 7,178,432 B1 | 2/2007 | Han et al. |
| 7,199,959 B1 | 4/2007 | Bryant |
| 7,203,020 B1 | 4/2007 | Viglione et al. |
| 7,209,310 B1 | 4/2007 | Tsai et al. |
| 7,222,410 B1 | 5/2007 | Klassen et al. |
| 7,236,911 B1 | 6/2007 | Gough et al. |
| 7,269,525 B1 | 9/2007 | Gough et al. |
| 7,458,282 B1 | 12/2008 | Wuester, Sr. et al. |
| 7,490,398 B1 | 2/2009 | Klassen et al. |
| 7,506,553 B1 | 3/2009 | Panyavoravaj |
| 7,509,224 B2 | 3/2009 | Holwell et al. |
| 7,549,204 B1 | 6/2009 | Vangal-Ramamurthy et al. |
| 7,552,526 B1 | 6/2009 | Klassen et al. |
| 7,559,590 B1 | 7/2009 | Jones |
| 7,561,416 B1 | 7/2009 | Sarraf |
| 7,596,722 B1 | 9/2009 | Pakzad et al. |
| 7,634,375 B1 | 12/2009 | Pakzad et al. |
| 7,653,983 B1 | 2/2010 | Klassen |
| 7,669,711 B1 | 3/2010 | Westwood |
| 7,671,599 B1 | 3/2010 | Tan et al. |
| 7,673,638 B1 | 3/2010 | Boynton et al. |
| 7,690,705 B1 | 4/2010 | Roberts et al. |
| 7,743,486 B1 | 6/2010 | Klassen et al. |
| 7,863,889 B1 | 1/2011 | Bamrungtham |
| 7,869,182 B1 | 1/2011 | Tan et al. |
| 7,869,183 B1 | 1/2011 | Tan et al. |
| 7,874,424 B1 | 1/2011 | Westwood |
| 7,896,218 B2 | 3/2011 | Rakpongsiri et al. |
| 7,900,272 B1 | 3/2011 | Tan et al. |
| 7,912,666 B1 | 3/2011 | Pakzad et al. |
| 7,916,599 B1 | 3/2011 | Panyavoravaj et al. |
| 7,921,543 B2 | 4/2011 | Trongjitwikrai et al. |
| 7,940,487 B1 | 5/2011 | Krishnan et al. |
| 7,974,038 B2 | 7/2011 | Krishnan et al. |
| 7,980,159 B1 | 7/2011 | Han |
| 7,987,585 B1 | 8/2011 | Klassen et al. |
| 8,066,171 B1 | 11/2011 | Rakpongsiri et al. |
| 8,078,421 B1 | 12/2011 | Shastry et al. |
| 8,092,610 B1 | 1/2012 | Tarrant |
| 8,094,414 B1 | 1/2012 | Cheng et al. |
| 8,098,460 B1 | 1/2012 | Jen et al. |
| 8,127,643 B1 | 3/2012 | Tan |
| 8,135,208 B1 | 3/2012 | Vangal-Ramamurthy |
| 8,162,366 B1 | 4/2012 | Tan et al. |
| 8,168,033 B1 | 5/2012 | Mohamad Nor |
| 8,180,487 B1 | 5/2012 | Vangal-Ramamurthy et al. |
| 8,199,425 B1 | 6/2012 | Gustafson et al. |
| 8,218,256 B1 | 7/2012 | Lin et al. |
| 8,223,448 B1 | 7/2012 | Haw et al. |
| 8,230,570 B1 | 7/2012 | Choong |
| 8,245,601 B1 | 8/2012 | Hastama et al. |
| 8,267,831 B1 | 9/2012 | Olsen et al. |
| 8,270,118 B1 | 9/2012 | Cheng et al. |
| 8,300,338 B1 | 10/2012 | McFadyen |
| 8,307,537 B1 | 11/2012 | Klassen et al. |
| 8,312,585 B1 | 11/2012 | Tarrant |
| 8,322,235 B1 | 12/2012 | Keopuang et al. |
| 8,327,529 B1 | 12/2012 | Tan et al. |
| 8,335,049 B1 | 12/2012 | Liu et al. |
| 8,345,367 B1 | 1/2013 | Tharumalingam |
| 8,356,384 B1 | 1/2013 | Ferre et al. |
| 8,369,073 B2 | 2/2013 | Trinh et al. |
| 8,379,363 B1 | 2/2013 | Kolunthavelu et al. |
| 8,387,631 B1 | 3/2013 | Thonghara et al. |
| 8,424,418 B1 | 4/2013 | Wuester, Sr. et al. |
| 8,424,824 B1 | 4/2013 | Tan et al. |
| 8,432,630 B1 | 4/2013 | Lin et al. |
| 8,432,631 B1 | 4/2013 | Lin et al. |
| 8,447,430 B1 | 5/2013 | Tan et al. |
| 8,447,551 B1 | 5/2013 | Ong et al. |
| 8,451,578 B1 | 5/2013 | Tan et al. |
| 8,453,841 B1 | 6/2013 | James et al. |
| 8,454,755 B1 | 6/2013 | Tan et al. |
| 8,485,772 B1 | 7/2013 | Ismail et al. |
| 8,493,681 B1 | 7/2013 | Selvaraj |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 | 10/2013 | Vangal-Ramamurthy et al. |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 8,707,531 B1 | 4/2014 | Sungkhaphong et al. |
| 8,713,333 B1 | 4/2014 | Selvaraj |
| 8,763,790 B1 | 7/2014 | Neamsuwan et al. |
| 8,789,446 B1 | 7/2014 | Sungkhaphong et al. |
| 8,811,135 B1 | 8/2014 | Kasino et al. |
| 2003/0053257 A1* | 3/2003 | Wada .............. G11B 5/486 360/245.9 |
| 2006/0152856 A1 | 7/2006 | Zhao et al. |
| 2008/0084630 A1 | 4/2008 | Trongjitwikrai et al. |
| 2009/0157848 A1 | 6/2009 | Khoo |
| 2010/0108256 A1 | 5/2010 | Roajanasiri et al. |
| 2012/0200287 A1 | 8/2012 | Warn et al. |
| 2013/0057986 A1 | 3/2013 | Vangal-Ramamurthy et al. |
| 2013/0248545 A1 | 9/2013 | Thongjitti et al. |
| 2013/0294210 A1* | 11/2013 | Taratorin ............ G11B 5/3189 369/53.38 |

\* cited by examiner

PRE-AMPLIFIER CARTRIDGE FOR TEST EQUIPMENT OF HEAD GIMBAL ASSEMBLY

BACKGROUND

Embodiments relate to the testing of components of Hard Disk Drives (HDD) during the manufacture thereof. In particular, embodiments relate to cartridges for Head Gimbal Assembly (HGA) tests that provide improved electrical characteristics for signal transmission between the Dynamic Electrical Test Equipment (DET) tester and the magnetic head of the HGA.

DETAILED DESCRIPTION

Figure 1:
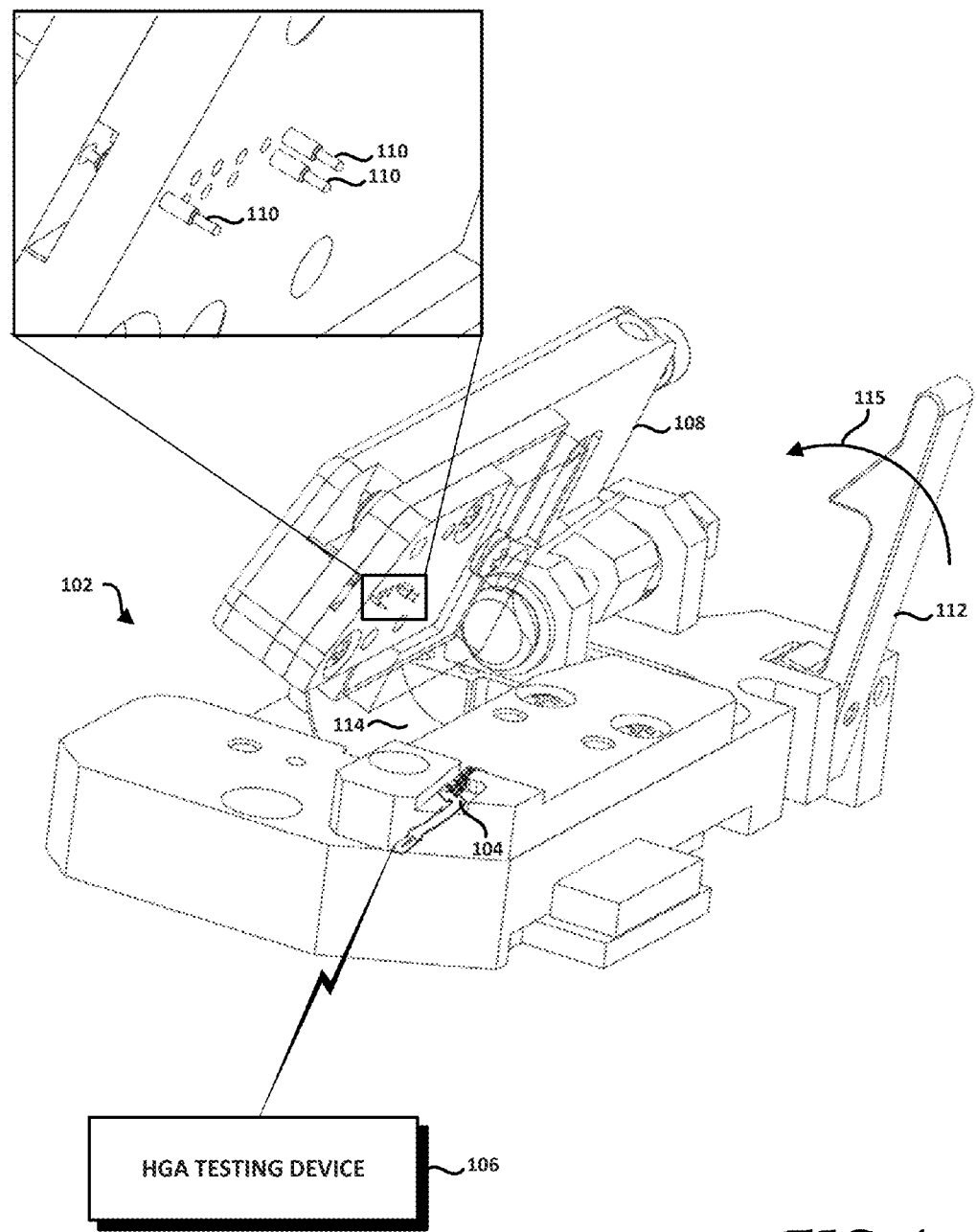
FIG. 1 is a perspective view of a cartridge in an open configuration, according to one embodiment.

The process of manufacturing HDDs and hybrid HDDs (i.e., HDDs that include a Flash memory) includes numerous test procedures, which procedures include parameter verification of the magnetic heads of the HGA under test. Magnetic heads may be tested after being assembled on the HGA, which is an assembly that includes a flex circuit board for the further connection of magnetic head to a pre-amplifier and to other electronic circuitry of the HDD. Magnetic heads may also be tested after being temporarily assembled on Cavity Gimbal Assemblies (CGAs) which appear the same as HGA to the testing device, which enables only non-conforming magnetic heads to be scrapped without requiring the disposal of the entire HGA mechanical or pre-amplifier circuit portion thereof. Manufacturers carry out HGA testing using Dynamic Electrical Test (DET) equipment. The DET equipment is configured to test the head of the HGA in conditions that are very close to those the head would encounter in the HDD, in that the heads are tested while flying over spinning magnetic media according to their nominal aerodynamic performance. According to one embodiment, the cartridge mechanically holds an HGA inserted therein in a locked position, whereupon the cartridge-HGA assembly is loaded into a HGA testing device. To provide for electrical connection between the HGA testing device and the HGA, probe pins contact electrical connection pads provided on the electrical traces of the flex circuit of the HGA. The probe pins (also known as pogo-pins) may form part of a connector board of the cartridge or may be provided as part of a separate solder-less probe pin block.

After the cartridge with its HGA loaded therein is mechanically and electrically connected to HGA testing device, the test procedures may begin. In this manner, the HGA under test is electrically connected to the HGA testing device that is mechanically and electrically loaded inside the cartridge. One embodiment is configured such that the electrical path of the signals between the HGA testing device and the head of the HGA is comparable to the distance of the electrical path followed by the signals between head of the HGA and the HDD control circuitry. This is advantageous, as testing the HGA under circumstances that differ significantly from the prevalent conditions in an actual HDD may undesirably lead to differences in performance of the head being tested as compared to the performance of the head in an actual HDD.

A cartridge, as used during extended production runs, may be subjected to a great many cycles of electrical and mechanical contacts, as HGAs to be tested are placed in and removed from the cartridge and as the cartridge in placed in and removed from the HGA testing device. Indeed, after thousands of connections and disconnections, the probe pins of the cartridge and contact pads may wear out. Therefore, replacement of predetermined constituent parts of cartridges according to one embodiment becomes an integral part of the cartridge maintenance procedure. One embodiment of a cartridge and corresponding HGA testing method recognizes that replacing circuits comprising electronic circuits and components increases the total expenses of HGA production. Thus, a cartridge according to one embodiment may comprise at least one readily replaceable inexpensive component comprising, for example, passive circuit elements or comprises only, for example, interconnects. When such a component reaches the end of its useful life, it may be swapped for a replacement and equally inexpensive component.

One embodiment, therefore, relates to a cartridge configured to receive a HGA to be tested by a HGA testing device. According to one embodiment, the cartridge may be configured to provide improved electrical characteristics for signal transmission between the HGA testing device and the magnetic head of the HGA. The cartridge may be configured, according to one embodiment, such that portions thereof may be readily replaced, thereby avoiding the need to discard the entire cartridge or major functional portions thereof during normal use.

Figure 2:
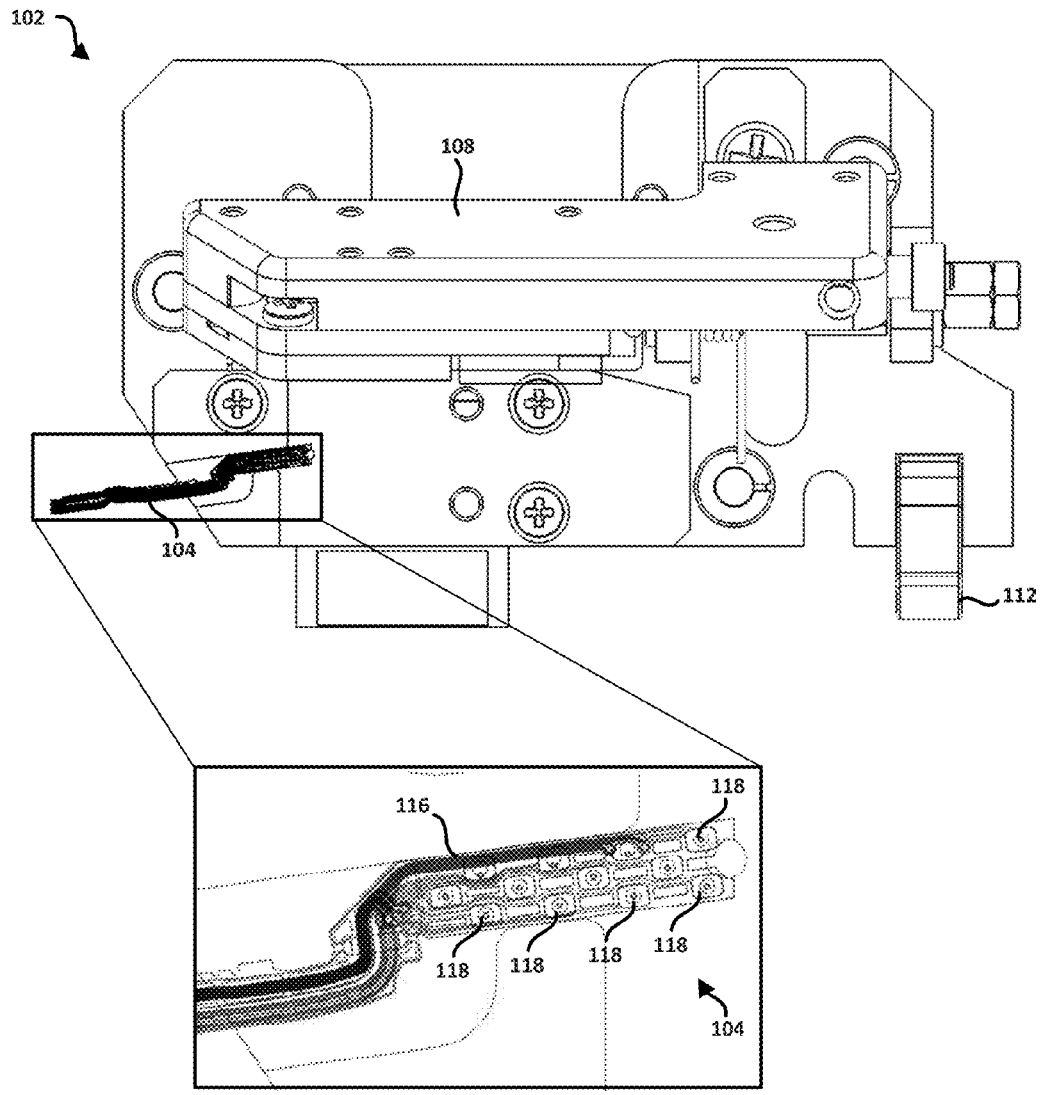
FIG. 2 is a top view of a cartridge according to one embodiment.
Figure 3:
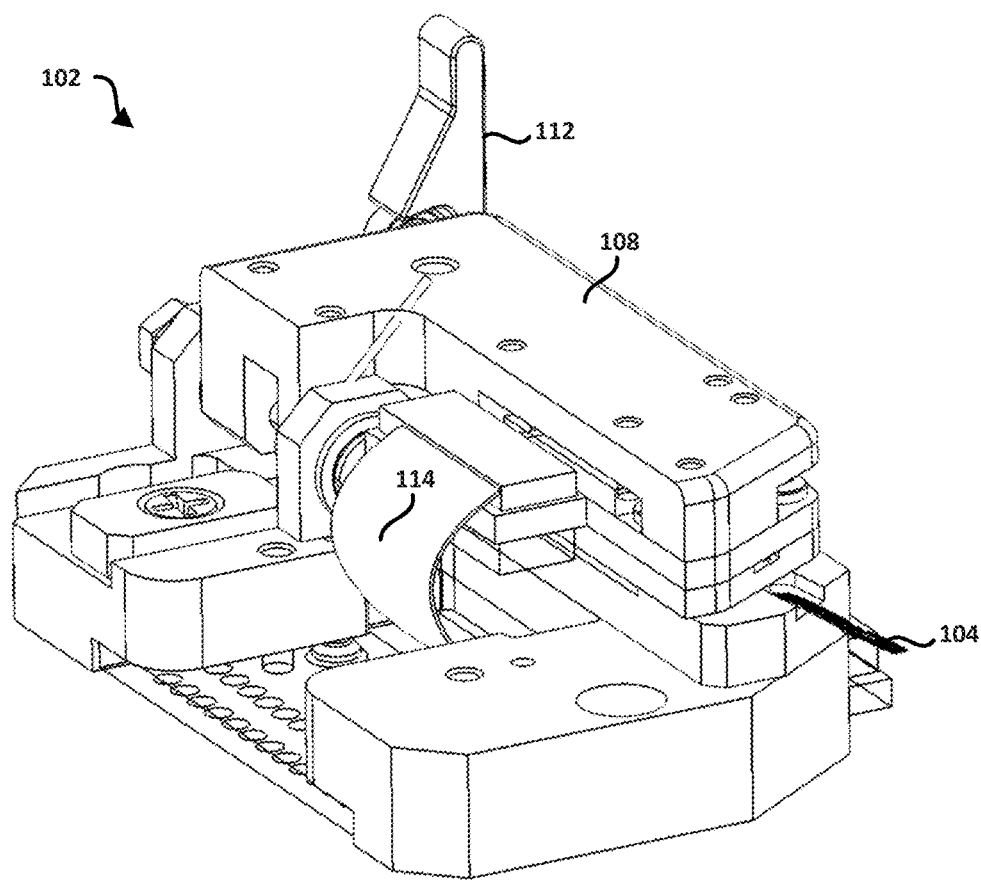
FIG. 3 is a perspective view of a cartridge in a closed configuration, according to one embodiment.

A cartridge according to one embodiment is shown in FIG. 1. FIG. 2 is a top view of the cartridge of FIG. 1. The cartridge of FIGS. 1 and 2 are shown in the open configuration, which is the configuration in which the HGA may be loaded into the cartridge. FIG. 3 is a perspective view of the cartridge of FIGS. 1 and 2, in the closed configuration, which is the configuration in which the HGA under test may be electrically connected to the HGA tester device. Considering now FIGS. 1-3 collectively, the cartridge 102 may be configured to receive, in a recess thereof, a HGA 104 of a HDD (not shown) and electrically connect the HGA 104 to a HGA testing device 106. According to one embodiment, the cartridge 102 may comprise a pre-amplifier (shown at 420 in FIGS. 4A and 4B). The pre-amplifier 420 may be configured to be electrically connected with corresponding electrical traces of the HGA 104 and to the HGA testing device 106. The pre-amplifier 420 provides write current to magnetic head of the HGA 104 in write mode and amplifies a read signal, received from the head of the HGA 104 in read mode, as well as read bias current or voltage in read mode; heater voltage for Dynamic Fly Height (DFH) control; sensor bias current or voltage for dynamic fly height sensing; laser or photodiode control for writing assist, for example.

A clamper 108 may be configured to selectively assume an open configuration, as shown in FIGS. 1 and 2, and a closed configuration, as shown in FIG. 3. A lever 112 may be configured to cause the clamper to assume the closed configuration of FIG. 3, upon being pushed in the direction indicated at 115. A plurality of probe pins 110 may extend a surface of the clamper 108 that faces the HGA 104. The probe pins 110 may be electrically connected to the pre-amplifier 420 and may be configured to be electrically connected to electrical traces of the HGA 104. As best shown in FIG. 2, the HGA may comprise a plurality of electrical traces 116.

When the clamper is caused to assume its closed configuration, the probe pins 110 may physically and electrically contact corresponding electrical traces 116. As shown in FIG. 2, each of the electrical traces 116 may terminate in an electrical pad 118. According to one embodiment, the plurality of probe pins 110 may be configured, when the clamper 108 is caused to assume its closed configuration, to contact a corresponding one of the electrical pads 118 of the HGA 104, thereby electrically connecting the head of the HGA 104 to the pre-amplifier and to the HGA testing device 106.

Figure 4A:
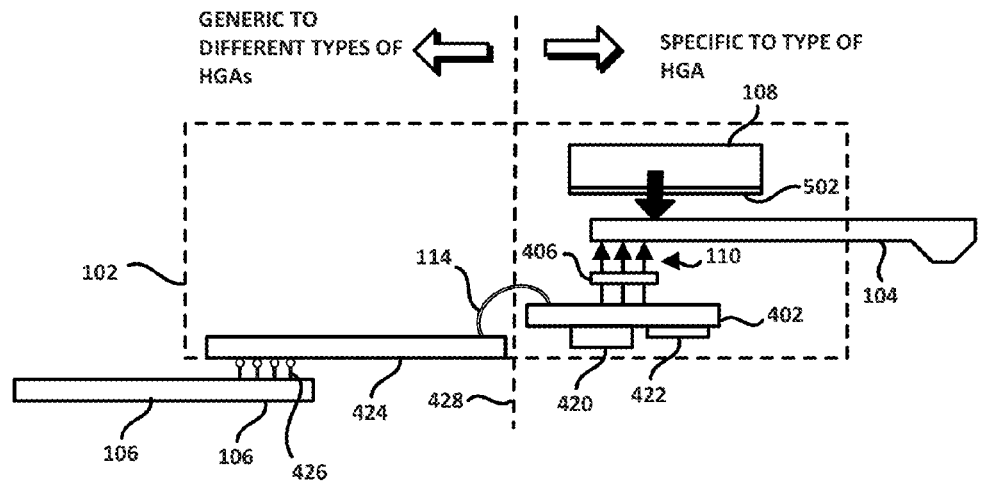
FIG. 4A is a block diagram that depicts components of a cartridge according to one embodiment.

As shown in FIG. 4A, one embodiment of a cartridge may comprise a first printed circuit board assembly (PCBA) 402 to which the pre-amplifier 420 circuit may be mechanically and electrically coupled. A second PCBA 406, separate from the first PCBA 402, may be provided. According to one embodiment, one or more of the probe pins 110 may be coupled to the second PCBA 406. Advantageously, the first and the second PCBAs 402, 406 may be configured to be removable and replaceable with replacement first and second PCBAs 402, 406. The first and second PCBAs 402, 406 may be swappable independently of one another. For example, the second PCBA 406 may require replacement more frequently than may be required for the first PCBA 402. For example, the probe pins 110 may, through repeated contact with corresponding electrical pads 118 of the HGA 104, may require to be replaced relatively more frequently than the first PCBA 402 may need to be replaced. The ability to replace the second PCBA 406 in the cartridge 102 independently of the other constituent components thereof is advantageous, as such structure and functionality enables comparatively lower maintenance costs, as compared to the case in which, for example, the probe pins and the relatively more costly pre-amplifier 420 were coupled to the same PCBA. The clamper 108 and the dielectric layer 502 disposed on one surface thereof are also shown in FIG. 4A. As shown, the clamper 108-dielectric 502 assembly may be on one side of the HGA 104 and the probe pins 110 on another side of the HGA 104.

Figure 4B:
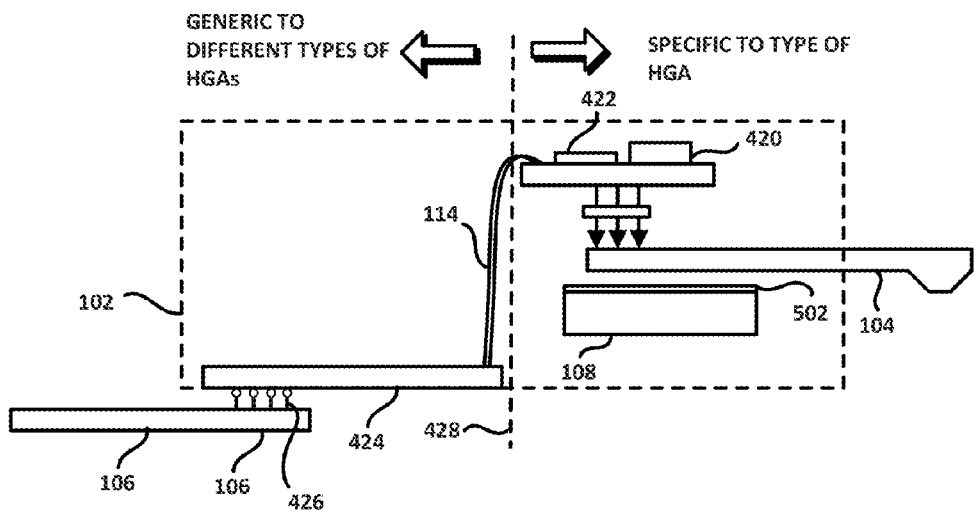
FIG. 4B is a block diagram that depicts components of a cartridge according to one embodiment.

FIG. 4B shows another implementation, in which the clamper 108-dielectric 502 assembly is on the "bottom" (one side of the HGA) and the probe pins are on the "top" (the other side of the HGA, according to one embodiment). It is to be noted that the dielectric layer 502 need not be disposed on the clamper 108. Indeed, the dielectric 502 may be disposed on a non-pivoting surface of the cartridge that faces the HGA.

As also shown in FIGS. 4A and 4B, the cartridge may be configured to comprise a non-volatile memory, such as an Electrically Erasable Programmable Read Only Memory (EEPROM). For example, the non-volatile memory may comprise Flash memory. According to one embodiment, the non-volatile memory may be provided on the first PCBA 402, as shown at 422. Other implementations and placements of the non-volatile memory 422 are possible. According to one embodiment, the non-volatile memory 422 may be configured to store HGA and/or cartridge configuration, parameters and HGA testing-related information. The non-volatile memory may be configured to be accessible to the HGA testing device 106. For example, the nonvolatile memory 422 may be configured to store HGA and/or cartridge configuration, parameters and HGA testing-related information for a single type of HGA or for several types of HGAs. In one implementation, the non-volatile memory 422 may store information regarding the type of the pre-amplifier 420, calibration constants, identification codes and/or executable files that may be executed by the HGA testing device 106. Indeed, the non-volatile memory 422 may be configured to present a consistent view to the HGA testing device, at least with respect to portions of the cartridge 102 and HGA that do not change from type-to-type of pre-amplifier 420. For example, such common view may take the form of an Application Program Interface or API. The non-volatile memory 422 may be configured to store information that will enable the HGA testing device to compensate for differences between types of HGAs and other differences cartridge to cartridge, so as to enable the HGA testing device to consistently deliver accurate measurements and test results that are not, to the extent practicable, dependent upon the electrical and mechanical characteristics of the cartridge 102.

It should be noted that in one embodiment, the first PCBA 402 comprises the pre-amplifier 420 and the non-volatile memory 422. In a further embodiment, the first PCBA 402 comprises the pre-amplifier 420 but does not comprise the non-volatile memory 422, whereas in yet another embodiment, the first PCBA 402 comprises the non-volatile memory 422 but does not comprise the pre-amplifier 420. Alternatively, still the pre-amplifier 420 and the non-volatile memory may be disposed elsewhere within the cartridge, either separately or mechanically and electrically coupled to a same structure.

The memory device 422 may also be configured to store real-time usage data specific to each cartridge, for predictive preventive maintenance alerting purposes, for example. Such real-time data may indicate when to change one of the constituent components of the cartridge such as, for example, worn out PCBAs, probe pins or probe pin blocks and the like. Moreover, a memory device such as shown at 422 may be placed on each of the inexpensive and interchangeable PCBAs or other sub-components of the cartridge to, for example, accumulate usage statistics or for other purposes.

One embodiment, therefore, is a device that is or comprises a cartridge 102 configured to receive a HGA 104 of a HDD and to electrically connect the HGA 104 to a HGA testing device 106. Such a cartridge 102 may comprise a pre-amplifier 420 that is configured to be electrically connected with corresponding electrical traces of the HGA 104 and to the HGA testing device 106. A non-volatile memory device 422 may also be provided within the cartridge 102, the non-volatile device being configured to store information about the HGA 104 and to be accessible to the HGA testing device 106. The cartridge may also comprise a plurality of probe pins 110 that are electrically connected to the pre-amplifier 420 and electrically connected to the electrical traces of the HGA 104. According to one embodiment, when the clamper 108 is in its closed configuration, the plurality of probe pins 110 are electrically connected to corresponding ones of the plurality of electrical traces of the HGA 104, which thereby enables the HGA 104 to be tested by the HGA testing device 106 according to the information about the HGA 104 retrieved by the HGA testing device 106 from the non-volatile memory 422.

According to one embodiment, the non-volatile memory may be configured to be readily swappable, either by itself or as part of a larger assembly. For example, the first PCBA 402, to which the non-volatile memory 422 may be coupled, may be configured to be readily removable and replaced with another similarly-structured PCBA 402, for example with a different pre-amplifier 420 and another non-volatile memory 422. Such a modular configuration enables the cartridge to be maintained at relatively low cost, and enables a same cartridge to be used in conjunction with a variety of different HGAs.

As also shown in FIGS. 4A and 4B, the cartridge 102 may further comprise a third PCBA 424 that may be configured for repeated connection—disconnection cycles to and from the HGA testing device 106. As shown in FIGS. 1-4, the third PCBA 424 may be electrically connected to the first PCBA 402 and/or to the second PCBA 406 via a connection 114. In the embodiment shown in FIGS. 1-4, the third PCBA 424 is electrically connected to the first PCBA 402 by, for example, 50-ohm coax micro-cables 114. Such 50-ohm coax micro-cables may be configured to provide connection for all signals, including power, acoustic emission, dual-stage actuator, laser and photo diodes, and control signals as well as read signals received from the head of the HGA 104 and write signals sent to the head of the HGA 104.

As alluded to above, one or more of the first, second and third PCBAs 402, 406, 424 may be configured to be removable from the cartridge and replaceable with replacement PCBAs. It is to be understood that a greater or lesser number of PCBAs may be present in the cartridge, according to embodiments.

The third PCBA 424, connected to first PCBA comprising the pre-amplifier 420, may be configured to transfer signals between pre-amplifier 420 and, for example, a buffer board of the HGA testing device 106. Toward that end, the third PCBA 424 may comprise a plurality of electrically-conductive pads for electrical connection with buffer board of the HGA testing device 106. In this manner, when the cartridge 102 is engaged (by machine or by a human operator) with the buffer board of the HGA testing device, probe pins 426 press against corresponding electrically-conductive pads of the third PCBA 424 and electrically connect the HGA testing device 106 to the third PCBA 424 and, through the third PCBA 424, to the first PCBA 402 and the electronic circuitry thereon, such as the pre-amplifier 420 and the non-volatile memory 422. In some applications, the buffer board PCBA 424 and its contact pads and probe pins 426 may be replaced by a second set of 50-Ohm coax micro-cables. Probe pins 426 (there may be more or less than four of them than four as shown) may be configured as a probe pin block or pogo pin block that itself may be readily replaceable with an inexpensive replacement block.

As suggested in FIGS. 4A and 4B by dividing line 428, a portion of the cartridge 102 may be configured to be generic to (and thus re-usable with) different types of HGAs, while another portion of the cartridge 102 may be configured to be specific to a particular type of HGA. In this manner, at least a part of the cartridge 102 may be re-used across types of HGAs, leading to still further savings in inventory and maintenance. For example, the third PCBA 424 within the cartridge 102, provided with interconnects and passive components only (in one embodiment), may be re-used across HGA types, whereas the first PCBA 402 comprising the active components (e.g., pre-amplifier 420 and non-volatile memory 422) and the second PCBA 406 (with which, in one embodiment, the impedance matching filter of FIG. 5B may be constructed) may be specific to a particular type or types of HGAs and would be replaced if not compatible with the type of the HGA currently under test. In this case, the entire cartridge 102 need not be replaced, as only the portion thereof comprising readily swappable components need be replaced.

It is understood that mechanical pressure caused by repeated connection and disconnections of the third PCBA 424 to and from the HGA testing device 106 may cause the electrically conductive pads on the third PCBA 424 to deteriorate over time and extended use. The third PCBA, according to one embodiment, may be configured such that it does not comprise many or any active components and may be procured, therefore, relatively inexpensively. The third PCBA 424 may, therefore, be configured to be disposable and replaceable, at a relatively low cost, as compared to the cost of replacing the entire cartridge or major sub-components thereof.

One embodiment provides a cartridge 102 in which the impedance of the cartridge may be electrically matched or substantially matched to the impedance of presented by the HGA 104 at the electrical traces of the flex circuit thereof. In particular, the impedance presented by the cartridge 102 at the probe pins 110 of the second PCBA 406 may be matched to the impedance presented by the HGA 104. Doing so allows maximum power transfer between the second PCBA 406 and the HGA 104 and reduces the complex reactance associated with the undesired reflectance of read and write signals. Therefore, according to one embodiment, the first, second and third PCBAs 402, 406 and 424 may have known and controlled impedances and may be configured such that the cartridge presents a substantially resistive or non-reactive load to the HGA 104.

According to one embodiment, the second PCBA 406 from which the probe pins 110 emerge, may be provided as part of the clamper 108. The clamper 108, it may be recalled, may be pivotally coupled to the remaining portion of the cartridge 102 and may, in a closed configuration, electrically contact the electrical traces of the HGA 104 under test via the probe pins 110. According to one embodiment, a filter may be provided between the cartridge 102 and the HGA 104. The cut-off frequency of such a filter may be selected to be sufficiently high as to enable the requisite high data rate operation of the HDD in which the HGA 104 is to be placed, with minimal reflection effects. According to one embodiment, the clamper 108, in combination with at least some of the probe pins 110, may form an electrical filter configured to at least condition signals to and from the pre-amplifier 420 and the HGA 104. In one implementation, the clamper 108 may be coupled to a reference voltage (such as, for example, ground) and the aforementioned electrical filter may be configured as a low-pass filter. The filter, according to embodiments, may be balanced or unbalanced, may include active components (such as operational amplifiers, for example) and/or passive components. According to one embodiment, the low-pass filter may comprise passive components, such as capacitors, inductors and resistors.

Figure 5A:
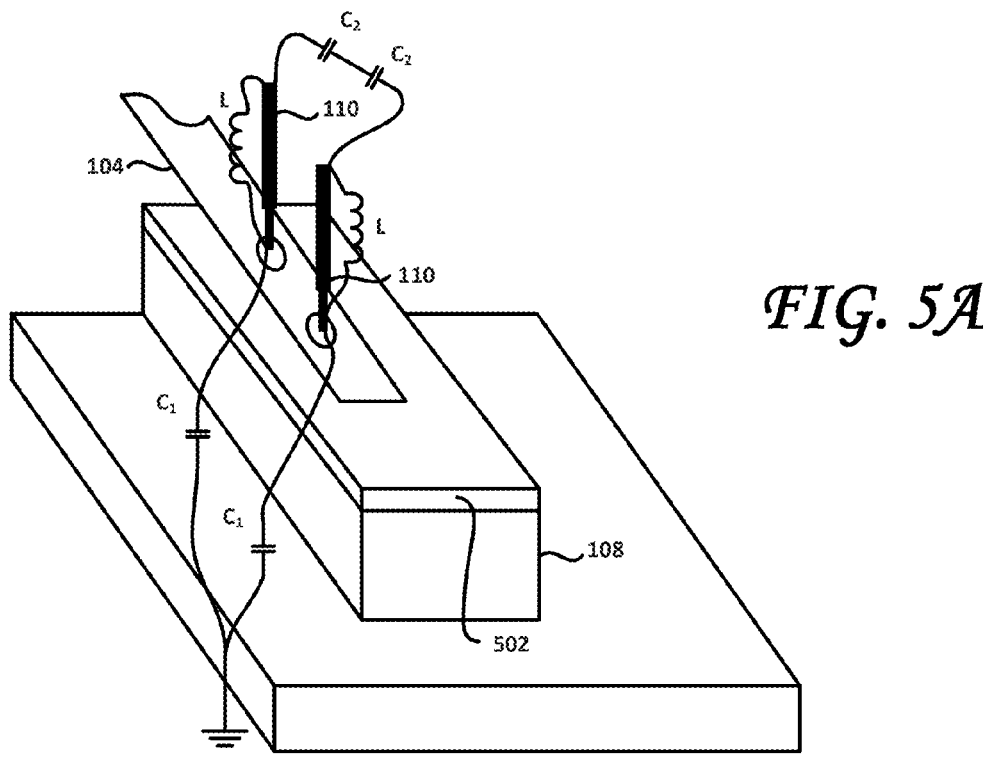
FIG. 5A is a representation of a portion of a cartridge, probe pins and electrical traces of the HGA, and illustrates the inductances and capacitances formed thereby, according to one embodiment.

The clamper 108, according to one embodiment, may be electrically conductive and electrically isolated from the electrical traces of the HGA by a dielectric layer that faces the HGA flex circuit. Indeed, to protect against undesirable electrical shorts and to provide isolation of the clamper 108 from the conductive pads on the HGA 104, an insulating thin film may deposited on a surface of the clamper 108. This dielectric film may comprise a material with good isolation properties and mechanical hardness. In this manner, the clamper, the dielectric layer thereof and the conductive pads/electrical traces of the HGA 104 may form a capacitor that, together with one or more passive components, forms the low-pass filter. The thickness and/or surface area of the dielectric layer on the clamper 108 may be selected according to the desired value of the resulting capacitance. The low pass filter may also comprise the bulk capacitance between differential pairs of the plurality of probe pins 110, as shown at $C_2$ in FIG. 5A. FIG. 5A is a representation that illustrates the inherent self-inductance and bulk capacitances created by the structures of the cartridge, such as the probe pins 110, the clamper 108 and its dielectric layer 502, the conductive pads and traces of the HGA 104. According to one embodiment, the self-inductances of one or more of the plurality of probe pins 110 may form another of the passive components of the low-pass filter at the interface between the cartridge 102 and the HGA 104.

According to one embodiment, when the clamper 108 presses the HGA 104 and the probe pins 110 against one another, the ends of the probe pins 110 are capacitively coupled to ground. Indeed, according to one embodiment and as shown in FIG. 5B, the conductive pads, the dielectric layer 502 and the (grounded, in one embodiment) body of the cartridge may store an electric charge and form a capacitance C1, the bulk capacitance between differential pairs of the plurality of probe pins 110 may form capacitances $C_2$ and the self-inductances of the probe pins may store a magnetic field and form inductances L.

Figure 5B:
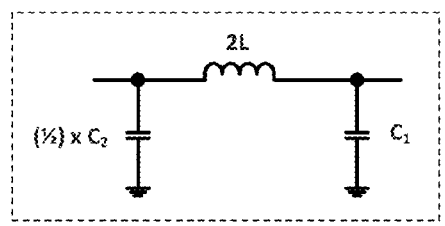
FIG. 5B is an equivalent circuit diagram of the inductances and capacitances shown in FIG. 5A, according to one embodiment.

The equivalent circuit formed by the inherent passive components $C_1$, $C_2$ and L is shown in FIG. 5B. The equivalent circuit of FIG. 5B is an unbalanced π capacitor-inductor-capacitor (C-L-C) filter. Such a C-L-C filter may be formed by the small capacitances between differential pairs of the probe pins 110 that carry the read and write signals between the HGA testing device 106 and the head of the HGA 104, and by the capacitance formed by the clamper 108 when the clamper 108 is in its closed configuration and covers the conductive pads and traces of the HGA 104. Capacitance C1, according to one embodiment, may be formed by metallic material of the clamper 108 connected to ground and the conductive pads of the HGA 104, with the dielectric 502 interposed therebetween. According to one embodiment, the dielectric 502 may be formed of and/or comprise a deposited thin insulating film such as a Diamond Like Coating (DLC).

The structures of the clamper 108 may be arranged, however, to form filters having other topologies such as, for example, an unbalanced T inductor-capacitor-inductor (L-C-L) filter. It is to be understood that still other balanced or unbalanced filters may be implemented using the inherent electrical characteristics of the structures depicted and described herein and/or other additional, discrete passive or active components, as appropriate for the application at hand.

To achieve maximum power transfer between the HGA 104 and the cartridge 102 and to reduce the power of reflected signals, the electrical filter formed at the interface between the HGA 104 and cartridge 102 may be configured such that the input impedance of the HGA testing device 106 matches the impedance of the HGA. Indeed, the resultant C-L-C filter may be configured to have good impedance matching characteristics with the flex circuit of the HGA 104 and may reduce reflection of write and read signals as they travel to and from the magnetic head of the HGA 104.

The π-type of C-L-C filter need not be at the interface between the probe pins 110 and the conductive pads terminating electrical traces of the HGA 104. Indeed, such a π-type of C-L-C filter may be provided elsewhere such as, for example, between the buffer board of the third PCBA 424 and the HGA 104.

According to one embodiment, maintenance costs may be reduced by, as shown and as detailed above, dividing electronics and interconnects within the cartridge over several (e.g., two or more) PCBAs. The first PCBA 402 may comprise active components (pre-amplifier 420, non-volatile memory 422) and may be one, with active components, is considered as permanent, or at least have a longer useful lifetime than the other PCBAs of the cartridge 102. The second PCBA 406 and the third PCBA 424, comprising the electrical filter and HGA testing device interconnects, may be configured so as to be readily and inexpensively replaced during regular maintenance.

Figure 6:
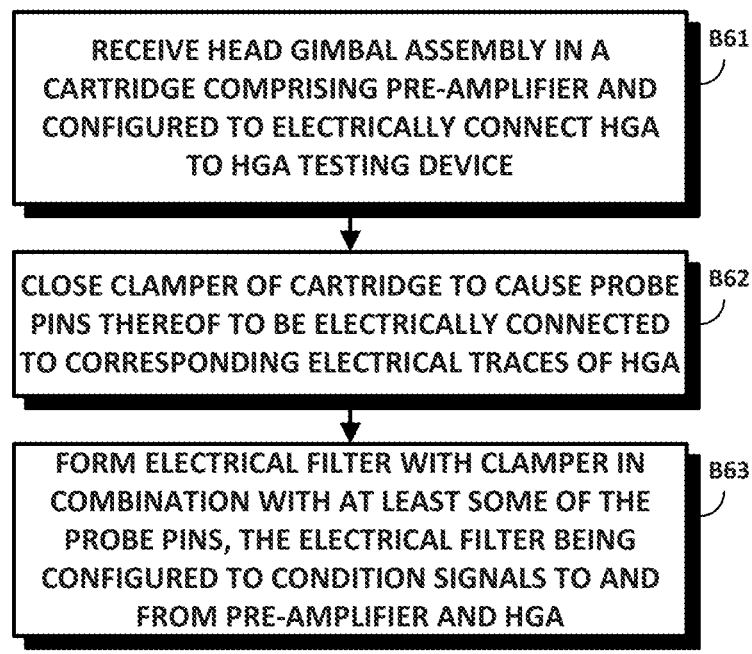
FIG. 6 is a block diagram of a method according to one embodiment.

FIG. 6 is a flowchart of a method according to one embodiment. As shown therein Block B61 calls for receiving a HGA of a hard disk drive in a cartridge 102 configured to electrically connect the HGA 104 to a HGA testing device 106. According to one embodiment, the cartridge 102 may comprise a pre-amplifier 420 configured to be electrically connected with corresponding electrical traces of the HGA 104 and to the HGA testing device 106, a plurality of probe pins 110 electrically connected to the pre-amplifier 420 and configured to be electrically connected to the electrical traces of the HGA 104 and a clamper 108, with the clamper 108 comprising a dielectric layer 502 and being configured to selectively assume an open configuration as shown in FIGS. 1 and 2 and a closed configuration, as shown in FIG. 3. Block B62 of the flowchart then calls for closing the clamper 108 to cause at least some of the plurality of probe pins 110 to be electrically connected to corresponding ones of the plurality of electrical traces of the HGA 104. Lastly, Block B63 specifies forming an electrical filter with the clamper 108, in combination with at least some of the probe pins 110, with the electrical filter being configured to condition signals to and from the pre-amplifier 420 and the HGA 104.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

The invention claimed is:

1. A device, comprising:
   a cartridge configured to receive a head gimbal assembly (HGA) of a storage device and electrically connect the HGA to a HGA testing device, the cartridge comprising:
      a pre-amplifier configured to be electrically connected with corresponding electrical traces of the HGA and to the HGA testing device;
      a plurality of probe pins electrically connected to the pre-amplifier and configured to be electrically connected to corresponding electrical traces of the HGA; and
      a clamper, the clamper comprising a dielectric layer and being configured to selectively assume an open configuration and a closed configuration;

wherein, in the closed configuration, the plurality of probe pins are electrically connected to corresponding ones of the electrical traces of the HGA and wherein the clamper, in combination with at least some of the probe pins, forms an electrical filter configured to condition signals to and from the pre-amplifier and the HGA.

2. The device of claim 1, wherein the cartridge further comprises:
a first printed circuit board assembly (PCBA), the pre-amplifier being coupled to the first PCBA; and
a second PCBA, at least some of the plurality of probe pins being coupled to the second PCBA.

3. The device of claim 2, further comprising non-volatile memory coupled to the first PCBA and wherein the non-volatile memory is configured to be accessible to the HGA testing device.

4. The device of claim 2, further comprising:
a third PCBA, the third PCBA being configured to connect to the HGA testing device, and to be electrically coupled to at least one of the first and second PCBAs.

5. The device of claim 4, wherein at least one of the first, second and third PCBAs are configured to be removable from the cartridge.

6. The device of claim 4, wherein the first, second and third PCBAs have controlled impedances.

7. The device of claim 1, wherein the clamper is coupled to a reference voltage and wherein the electrical filter is a low-pass filter comprising passive components, at least one of which is a capacitor formed by at least some of the electrical traces of the HGA, the dielectric layer and the clamper.

8. The device of claim 7, wherein the electrical filter is a π capacitor-inductor-capacitor (CLC) filter.

9. The device of claim 7, wherein the electrical filter is a T inductor-capacitor-inductor (LCL) filter.

10. The device of claim 1, wherein the electrical filter is a low-pass filter comprising passive components, at least one of which is a bulk capacitance between differential pairs of the plurality of probe pins.

11. The device of claim 1, wherein the electrical filter is a low-pass filter comprising passive components, at least one of which is a self-inductance of at least one of the plurality of probe pins.

12. The device of claim 1, wherein the electrical filter is configured to substantially match an impedance of the HGA tester with an impedance of the HGA.

13. A method, comprising:
receiving a head gimbal assembly (HGA) of a storage device in a cartridge configured to electrically connect the HGA to a HGA testing device, the cartridge comprising:
a pre-amplifier configured to be electrically connected with corresponding electrical traces of the HGA and to the HGA testing device;
a plurality of probe pins electrically connected to the pre-amplifier and configured to be electrically connected to corresponding electrical traces of the HGA; and
a clamper, the clamper comprising a dielectric layer and being configured to selectively assume an open configuration and a closed configuration;
closing the clamper to cause at least some of the plurality of probe pins to be electrically connected to corresponding ones of the electrical traces of the HGA; and
forming an electrical filter with the clamper, in combination with at least some of the probe pins, the electrical filter being configured to condition signals to and from the pre-amplifier and the HGA.

14. The method of claim 13, wherein the cartridge further comprises:
a first printed circuit board assembly (PCBA), the pre-amplifier being coupled to the first PCBA; and
a second PCBA, at least some of the plurality of probe pins being coupled to the second PCBA.

15. The method of claim 14, wherein the cartridge further comprises nonvolatile memory coupled to the first PCBA and wherein the method further comprises accessing, by the HGA testing device, the non-volatile memory.

16. The method of claim 14, wherein the cartridge further comprises:
a third PCBA, the third PCBA being configured to connect to the HGA testing device, the third PCBA being electrically coupled to at least one of the first and second PCBAs.

17. The method of claim 16, further comprising removing one of the first, second and third PCBAs from the cartridge and replacing the removed one of the first, second and third PCBAs with a corresponding replacement PCBA.

18. The method of claim 16, wherein the first, second and third PCBAs have controlled impedances.

19. The method of claim 13, further comprising coupling the clamper to a reference voltage and configuring the electrical filter as a low-pass filter comprising passive components, at least one of which is a capacitor formed by at least some of the electrical traces of the HGA, the dielectric layer and the clamper.

20. The method of claim 19, further comprising configuring the electrical filter as a π capacitor-inductor-capacitor (CLC) filter.

21. The method of claim 19, further comprising configuring the electrical filter as a T inductor-capacitor-inductor (LCL) filter.

22. The method of claim 13, further comprising configuring the electrical filter as a low-pass filter comprising passive components, at least one of which is a bulk capacitance between differential pairs of the plurality of probe pins.

23. The method of claim 13, further comprising configuring the electrical filter as a low-pass filter comprising passive components, at least one of which is a self-inductance of at least one of the plurality of probe pins.

24. The method of claim 13, wherein the clamper is coupled to a reference voltage and wherein the method further comprises configuring the electrical filter as a low-pass filter comprising passive components, at least one of which is an inductor formed by at least some of the electrical traces of the HGA, the dielectric layer and the clamper.

25. The method of claim 13, further comprising configuring the electrical filter to substantially match an impedance of the HGA tester with an impedance of the HGA.

26. A device, comprising:
a cartridge configured to receive a head gimbal assembly (HGA) of a storage device and electrically connect the HGA to a HGA testing device, the cartridge comprising:
a pre-amplifier configured to be electrically connected with corresponding electrical traces of the HGA and to the HGA testing device;
a non-volatile memory device, the non-volatile device being configured to store information about the HGA and being accessible to the HGA testing device;
a plurality of probe pins electrically connected to the pre-amplifier and configured to be electrically connected to corresponding electrical traces of the HGA; and a clamper, the clamper being configured to selectively assume an open configuration and a closed configuration;

wherein when the clamper is in the closed configuration, the plurality of probe pins are electrically connected to corresponding ones of the plurality of electrical traces of the HGA, thereby enabling the HGA to be tested by the HGA testing device according to the information about the HGA retrieved by the HGA testing device from the nonvolatile memory.

* * * * *